US011187849B2

(12) United States Patent
Nakamura

(10) Patent No.: US 11,187,849 B2
(45) Date of Patent: Nov. 30, 2021

(54) LIGHTING DEVICE AND DISPLAY DEVICE

(71) Applicant: SHARP KABUSHIKI KAISHA, Sakai (JP)

(72) Inventor: Yoshitake Nakamura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 148 days.

(21) Appl. No.: 16/724,330

(22) Filed: Dec. 22, 2019

(65) Prior Publication Data

US 2020/0200966 A1 Jun. 25, 2020

Related U.S. Application Data

(60) Provisional application No. 62/784,514, filed on Dec. 23, 2018.

(51) Int. Cl.
*F21V 8/00* (2006.01)

(52) U.S. Cl.
CPC ......... *G02B 6/0088* (2013.01); *G02B 6/0055* (2013.01)

(58) Field of Classification Search
CPC .. G02B 6/0051; G02B 6/0053; G02B 6/0066; G02B 6/0031; G02B 6/0088; G02B 6/0055
See application file for complete search history.

(56) References Cited

U.S. PATENT DOCUMENTS

2012/0327307 A1* 12/2012 Nakamura ........... G02B 6/0078
348/725

FOREIGN PATENT DOCUMENTS

JP 2009-272451 A 11/2009

* cited by examiner

*Primary Examiner* — Joseph L Williams
*Assistant Examiner* — Jose M Diaz
(74) *Attorney, Agent, or Firm* — ScienBiziP, P.C.

(57) ABSTRACT

A lighting device includes a light source, a light guide plate, a chassis, a reflection sheet, and a supplementary member. The light guide plate is configured to guide light from the light source. The chassis includes a bottom for housing the light guide plate and recesses in the bottom. The reflection sheet is disposed between the light guide plate and the bottom and configured to reflect light toward the light guide plate. The supplementary member includes a body having a plate shape and is disposed between the reflection sheet and the bottom. The body includes a plate surface on a reflection sheet side including a flat surface.

7 Claims, 5 Drawing Sheets

LIGHTING DEVICE AND DISPLAY DEVICE

CROSS REFERENCE TO RELATED APPLICATION

This application claims priority from U.S. Provisional Patent Application No. 62/784,514 filed on Dec. 23, 2018. The entire contents of the priority application are incorporated herein by reference.

TECHNICAL FIELD

The technology described herein relates to a lighting device and a display device.

BACKGROUND

A liquid crystal display device including an edge-light type (a side-light type) backlight unit in which a light source is disposed behind an edge of a liquid crystal panel such as one disclosed in Japanese Unexamined Patent Application Publication No. 2009-272451 has been known. In the edge-light type backlight unit, light from the light source such as an LED enters a light guide plate, travels through the light guide plate, and exits toward the liquid crystal panel. A reflection sheet is disposed behind the light guide plate (on an opposite side from the liquid crystal panel). The reflection sheet reflects leakage light from the back surface of the light guide plate to return the light to the light guide plate. The light guide plate and the reflection sheet are housed in a chassis made of metal. The chassis has a box shape with an opening on a liquid crystal panel side.

The light guide plate and the reflection sheet made of synthetic resins may expand and contact according to operating temperatures. If variations in operating temperature repeatedly occur, from low to high and from high to low, the light guide plate and the reflection sheet repeatedly expand and contract. If the reflection sheet and the light guide plate are placed on the bottom of the chassis in this sequence and housed in the chassis, surfaces of the bottom of the chassis and the reflection sheet that contact each other or surfaces of the reflection sheet and the light guide plate that contact each other may rub against each other due to the expansion and the contraction.

The bottom of the chassis may include a recess formed in a flat surface by drawing a section of the flat surface to recess toward the rear (an opposite side from the liquid crystal panel). If the reflection sheet and the bottom of the chassis rub against each other due to the expansion and the contraction, the reflection sheet may be drawn into an internal space of the recess due to a weight of the light guide plate and warped or scarred along a border between the flat surface and the recess. The reflection sheet made of the synthetic resin has a thickness in a range from 100 μm to 300 μm, that is, the reflection sheet is thin. The recess may affect the light guide plate on the reflection sheet, that is, the back surface of the light guide plate may be scarred. Scars on the reflection sheet or the light guide plate or warp of the reflection sheet may cause uneven brightness in the backlight unit or the liquid crystal display device includes the backlight unit.

SUMMARY

The technology described herein was made in view of the above circumstances. An object is to reduce uneven brightness.

A lighting device according to the technology described herein includes a light source, a light guide plate, a chassis, and a supplementary member. The light guide plate is configured to guide light from the light source. The chassis includes a bottom for housing the light guide plate and recesses in the bottom. The supplementary member includes a body having a plate shape. The supplementary member is disposed between the reflection sheet and the bottom. The body includes a plate surface on a reflection sheet side includes a flat surface.

A display device according to the technology described herein includes the lighting device and a display panel configured to display as image using light applied by the lighting device.

According to the technology described herein, uneven brightness can be reduced.

DETAILED DESCRIPTION

First Embodiment

Figure 1:
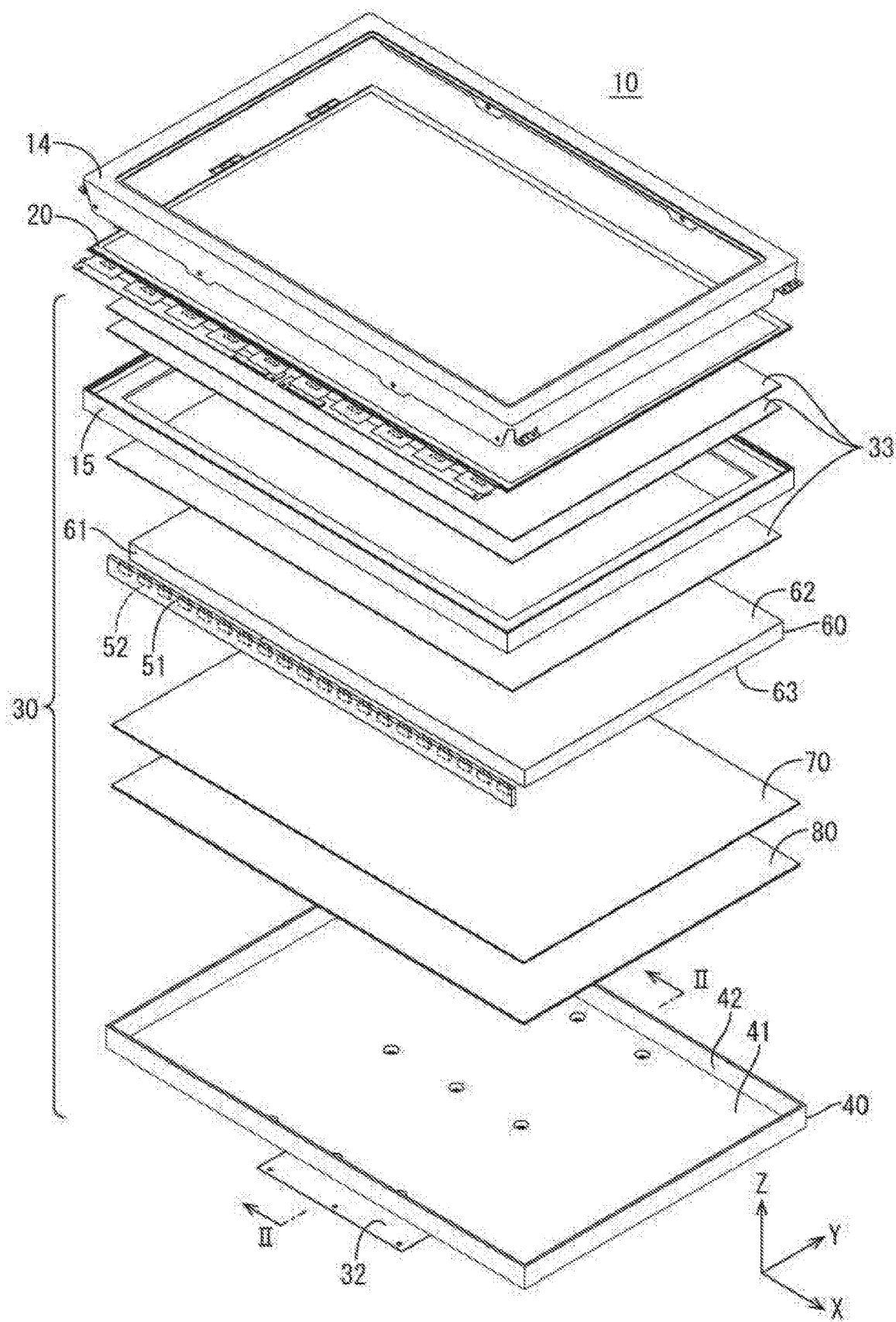
FIG. 1 is an exploded perspective view of a liquid crystal display device according to a first embodiment.

A first embodiment of the technology described herein will be described in detail with reference to FIGS. 1 and 2. In this section, a liquid crystal display device 10 (an example of a display device) including a backlight unit 30 (an example of a lighting device) will be described. In the drawings, X-axes, Y-axes, and Z-axes may be present. The axes in each drawing correspond to the respective axes in other drawings. A liquid crystal panel 20 side in the Z-axis direction and an opposite side from the liquid crystal panel 20 in the Z-axis direction correspond to the front side and the rear side of the liquid crystal display device 10.

As illustrated in FIG. 1, the liquid crystal display device 10 includes a liquid crystal panel 20 (an example of a display panel) configured to display images and the backlight unit 30 (an example of the lighting device) configured to apply light to the liquid crystal panel 20. The liquid crystal panel 20 and the backlight unit 30 are held together by a bezel 14 having a frame shape. The liquid crystal panel 20 has a horizontally rectangular overall shape. The liquid crystal panel 20 includes a pair of glass substrates that are bonded together with a predefined gap therebetween and a liquid crystal layer sealed between the glass substrates. The glass substrates are transparent (having high light transmissivity). Polarizing plates are disposed on outer surfaces of the glass substrates.

Figure 2:
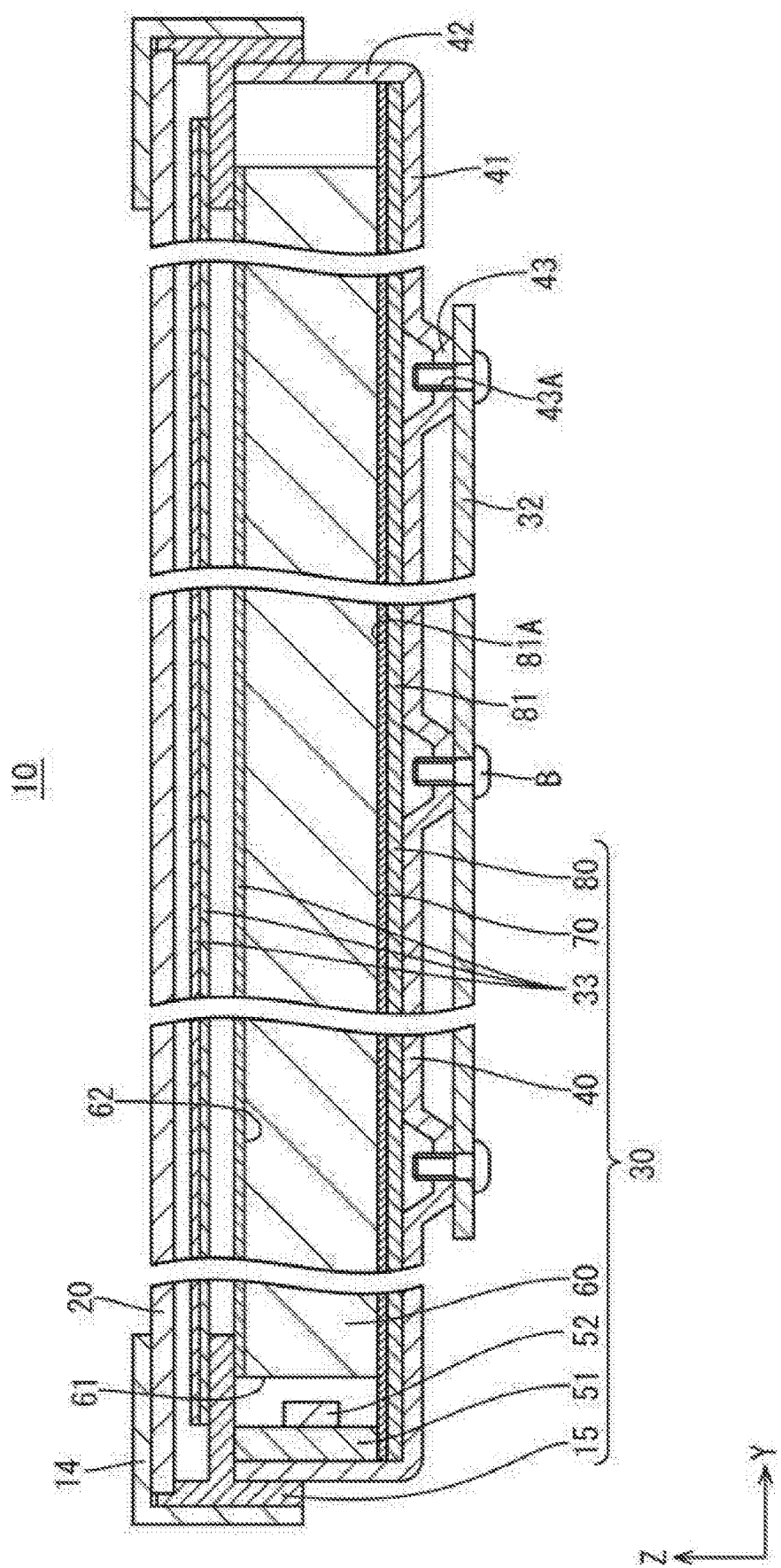
FIG. 2 is a cross-sectional view along line II-II in FIG. 1.

As illustrated in FIGS. 1 and 2, the backlight unit 30 includes a chassis 40 (a backlight chassis) having a box shape with an opening on the front side (on the light exiting side, the liquid crystal panel 20 side). Light emitting diodes (LEDs) 52 (a light source), an LED substrate 51, a light guide plate 60, an optical sheet 33, a reflection sheet 70, and a supplementary member 80 are housed in the chassis 40. The LEDs 52 are mounted on the LED substrate 51. The light guide plate 60 is configured to guide light from the LEDs 52. The optical sheet 33 is configured to exert predefined optical effects on the light exiting from the light guide plate 60. The reflection sheet 70 is configured to reflect leakage light toward the light guide plate 60. The supplementary member 80 is disposed between the reflection sheet 70 and the bottom 41 of the chassis 40. The backlight unit 30 includes a frame 15 having a frame shape to surround the LEDs 52, the light guide plate 60, and the optical sheet 33. As illustrated in FIG. 1, the LEDs 52 are disposed along a long edge of the backlight unit 30, that is, the backlight unit 30 is a single-side light entering type edge-lit (side-lit) backlight in which light from the LEDs 52 enters the light guide plate 60 only from one side. Next, components of the backlight unit 30 will be described in detail.

As illustrated in FIGS. 1 and 2, the LEDs 52 are arranged in line and at equal intervals on a surface (a mounting surface) of the LED substrate 51. The LED substrate 51 has an elongated plate shape that extends along one of long edges of the chassis 40. The LEDs 52 are adjacent to a side surface 61 (a light entering end surface) of the light guide plate 60 with a predefined gap between the light guide plate 60 and the LEDs 52.

As illustrated in FIGS. 1 and 2, the light guide plate 60 has a horizontally-long rectangular shape in the plan view similar to the liquid crystal panel 20 and the bottom 41 of the chassis 40. The light guide plate 60 has a thickness larger than the thickness of the optical sheet. The light guide plate 60 is made of a substantially transparent synthetic resin material having a refractive index sufficiently higher than the refractive index of air (e.g., acrylic resin such as PMMA, poly carbonate). The light guide plate 60 receives the light that is emitted by the LEDs 52 in the Y-axis direction through the light entering end surface 61, transmits the light therethrough, and guides the light toward the optical sheet 33 such that the light exits through the front surface 62 (a light exiting plate surface) on the front side.

The optical sheet has flexibility. As illustrated in FIGS. 1 and 2, the optical sheet 33 has a horizontally-long rectangular shape in the plan view similar to the liquid crystal panel 20 and the bottom 41 of the chassis 40. The optical sheet 33 includes at least a diffuser sheet and a light collecting (prism) sheet that are disposed on top of each other. The optical sheet 33 is disposed between the liquid crystal panel 20 and the light guide plate 60 to exert predefined optical effects on the light exiting from the light guide plate 60 and to guide the light toward the liquid crystal panel 20.

As illustrated in FIGS. 1 and 2, the reflection sheet 70 has a horizontally-long rectangular shape in the plan view similar to the liquid crystal panel 20 and the bottom 41 of the chassis 40. The reflection sheet 70 is made of synthetic resin and includes a white surface having high light reflectivity. The reflection sheet 70 is disposed on a back surface 63 of the light guide plate 60. The reflection sheet 70 reflects leakage light from the back surface 63 of the light guide plate 60 or the LEDs 52 toward the light guide plate 60.

The chassis 40 is made of metal or resin. As illustrated in FIGS. 1 and 2, the chassis 40 has shallow box shape with an opening on the front side. The chassis 40 includes the bottom 41 and sides 42. The bottom 41 has a horizontally-long rectangular shape similar to the liquid crystal panel 20. The sides 42 project from the outer edges of the bottom 41 toward the front side. On an outer surface of the bottom 41 on the rear side, substrates 32 such as a control circuit for supplying control signals to the liquid crystal panel 20 and a power supply substrate are mounted.

As illustrated in FIGS. 1 and 2, the bottom 41 includes recesses 43 that are formed to protrude from the back of the chassis 40. The recesses 43 are formed by drawing sections of the bottom 41 toward the rear side. The recesses 43 are mounting bases for mounting the substrates 32. The substrates 32 are placed on the recesses 43 and fixed to the bottom 41 with screws B. The recesses 43 include insertion holes 43A. The screws B are inserted into internal spaces of the recesses 43 through the insertion holes 43A.

The supplementary member 80 that includes a body 81 having a plate shape is disposed between the bottom 41 and the reflection sheet 70. The body 81 includes a single plate that may be made of synthetic resin such as poly carbonate or metal such as aluminum, stainless steel, and iron (including alloy). At least a plate surface 81A that is one of plate surfaces of the body 81 on a reflection sheet 70 side may include a flat surface without irregularity.

As described above, the backlight unit 30 according to this embodiment includes the LEDs 52, the light guide plate 60, the chassis 40, the reflection sheet 70, and the supplementary member 80. The light guide plate 60 guides the light from the LEDs 52. The chassis 40 includes the bottom 41 that houses the light guide plate 60. The bottom 41 includes the recesses 43. The reflection sheet 70 is disposed between the light guide plate 60 and the bottom 41 to reflect the light toward the light guide plate 60. The supplementary member 80 includes the body 81 that is disposed between the reflection sheet 70 and the bottom. The plate surface 81A of the body 81 on the reflection sheet 70 side includes the flat surface.

Because the body 81 of the supplementary member 80 is disposed between the reflection sheet 70 and the bottom 41 of the chassis 40, the reflection sheet 70 and the bottom 41 of the chassis 40 are less likely to contact each other and thus less likely to rub against each other. The reflection sheet 70 may rub against the body 81 when the reflection sheet 70 expands and contracts. Because the body 81 includes the flat surface on the reflection sheet 70 side, the reflection sheet 70 is less likely to have local scars or a warp. Therefore, uneven brightness resulting from the recesses 43 in the bottom 41 of the chassis 40 is less likely to occur.

The body 81 in this embodiment includes the single plate. In a configuration in which the body 31 includes multiple plates, a step may be created between the adjacent plates. The step may cause scars on the reflection sheet 70 and the light guide plate 60 or a warp of the reflection sheet 70. This may result in uneven brightness. Because the body 81 includes the single plate, such a problem is less likely to occur.

The material of the body 81 in this embodiment may be resin or metal. Because the body 81 is made of such a material, the body 81 has a predefined level of hardness. According to the configuration, the recesses 43 in the chassis 40 are less likely to affect the reflection sheet 70 and the light guide plate 60 on the body 81.

Second Embodiment

Figure 3:
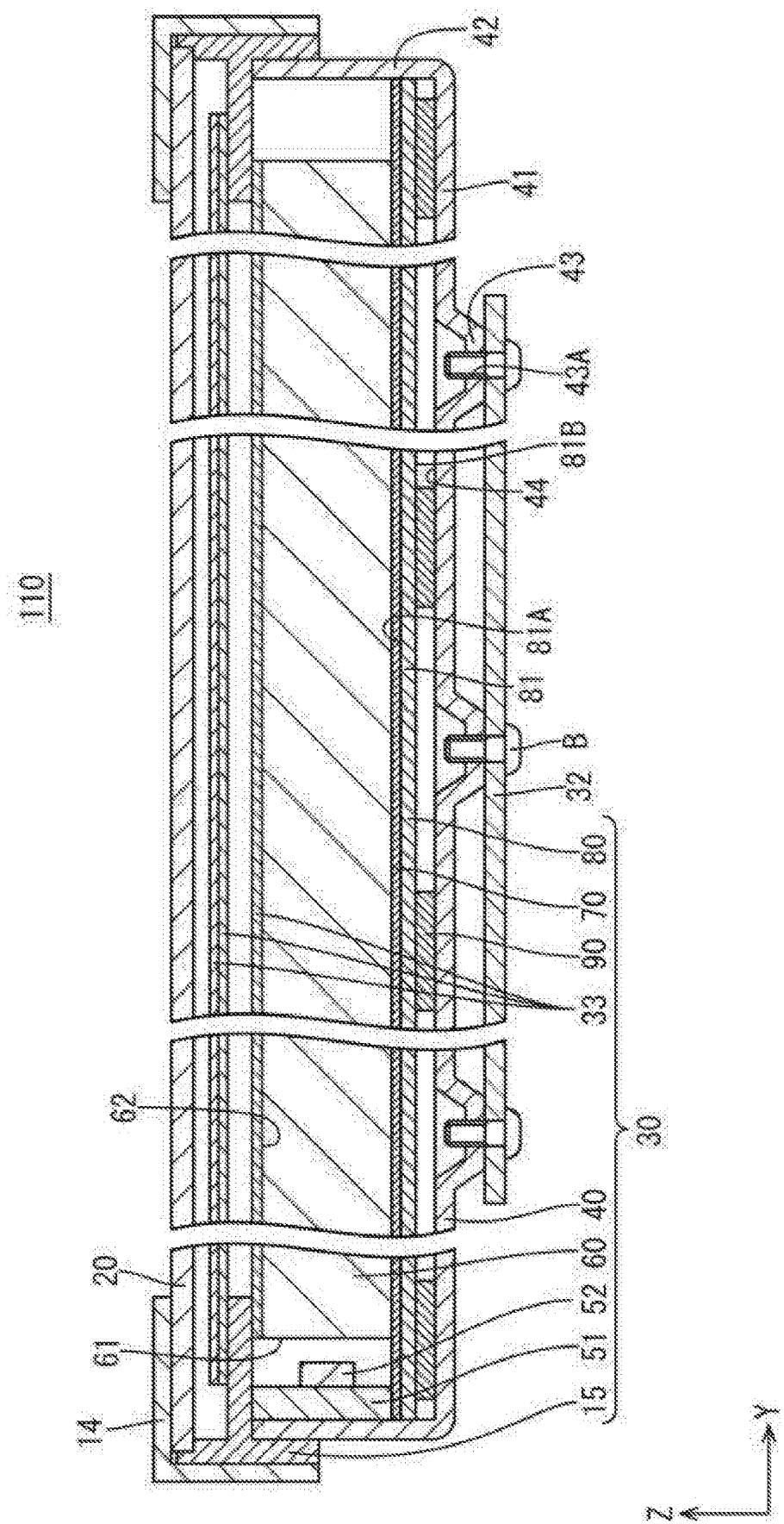
FIG. 3 is a cross-sectional view of a liquid crystal display device according to a second embodiment along line II-II in FIG. 1.

A liquid crystal display device 110 according to a second embodiment of the technology described herein will be described with reference to FIG. 3. In the second embodiment, the supplementary member 80 is fixed to the chassis 40 with double-sided adhesive tapes 90. Components, functions, and effects similar to those of the first embodiment previously described will not be described.

In this embodiment, the back surface 81B of the body 81 of the supplementary member 80 and the front surface 44 of the bottom 41 of the chassis 40 are fixed to each other with the double-sided adhesive tapes 90 (an example of a fixing member) according to the configuration, the supplementary member 80 is stably disposed. Size and locations of the double-sided adhesive tapes 90 are not limited as long as the double-sided adhesive tapes 90 fix the supplementary member 80 to the chassis 40 so that the supplementary member 80 is integrally provided with the chassis 40. The fixing member is not limited to the double-sided adhesive tapes 90. The fixing member may be an adhesive.

Third Embodiment

Figure 4:
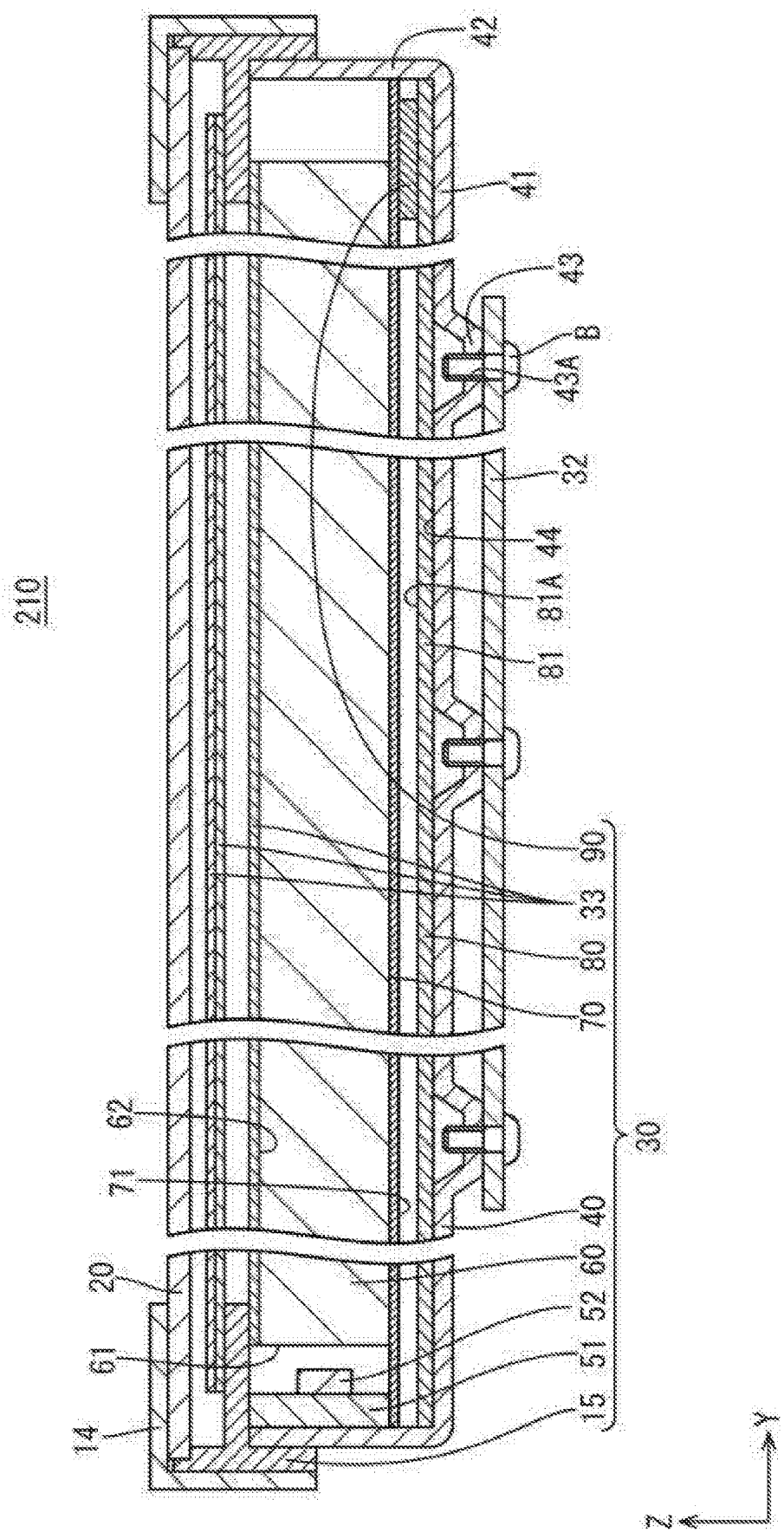
FIG. 4 is a cross-sectional view of a liquid crystal display device according to a third embodiment along line II-II in FIG. 1.

A third embodiment of the technology described herein will be described with reference to FIG. 4. In the third embodiment, the supplementary member 80 and the reflection sheet 70 are fixed to each other with the double-sided adhesive tape 90. Components, functions, and effects similar to those of the first embodiment and the second embodiment previously described not be described.

In this embodiment, the front surface 81A (the plate surface on the reflection sheet 70 side) of the body 81 of the supplementary member 80 and the back surface 71 of the reflection sheet 70 are fixed to each other with the double-sided adhesive tape 90. According to the configuration, the supplementary member 80 is stably disposed. The reflection sheet 70 may expand and contract according to the operating temperatures. If double-sided adhesive tapes 90 are attached to multiple sections, the reflection sheet 70 may be curved or warped. Therefore, it is preferable to attach the double-sided adhesive tape 90 to a section of an outer edge of the reflection sheet 70. More preferably, the reflection sheet 70 may be attached to an edge away from the LEDs 52 as illustrated in FIG. 4 so that the double-sided adhesive tape 90 is less likely to be under an influence of variations in temperature due to heat radiated by the LEDs 52.

Fourth Embodiment

Figure 5:
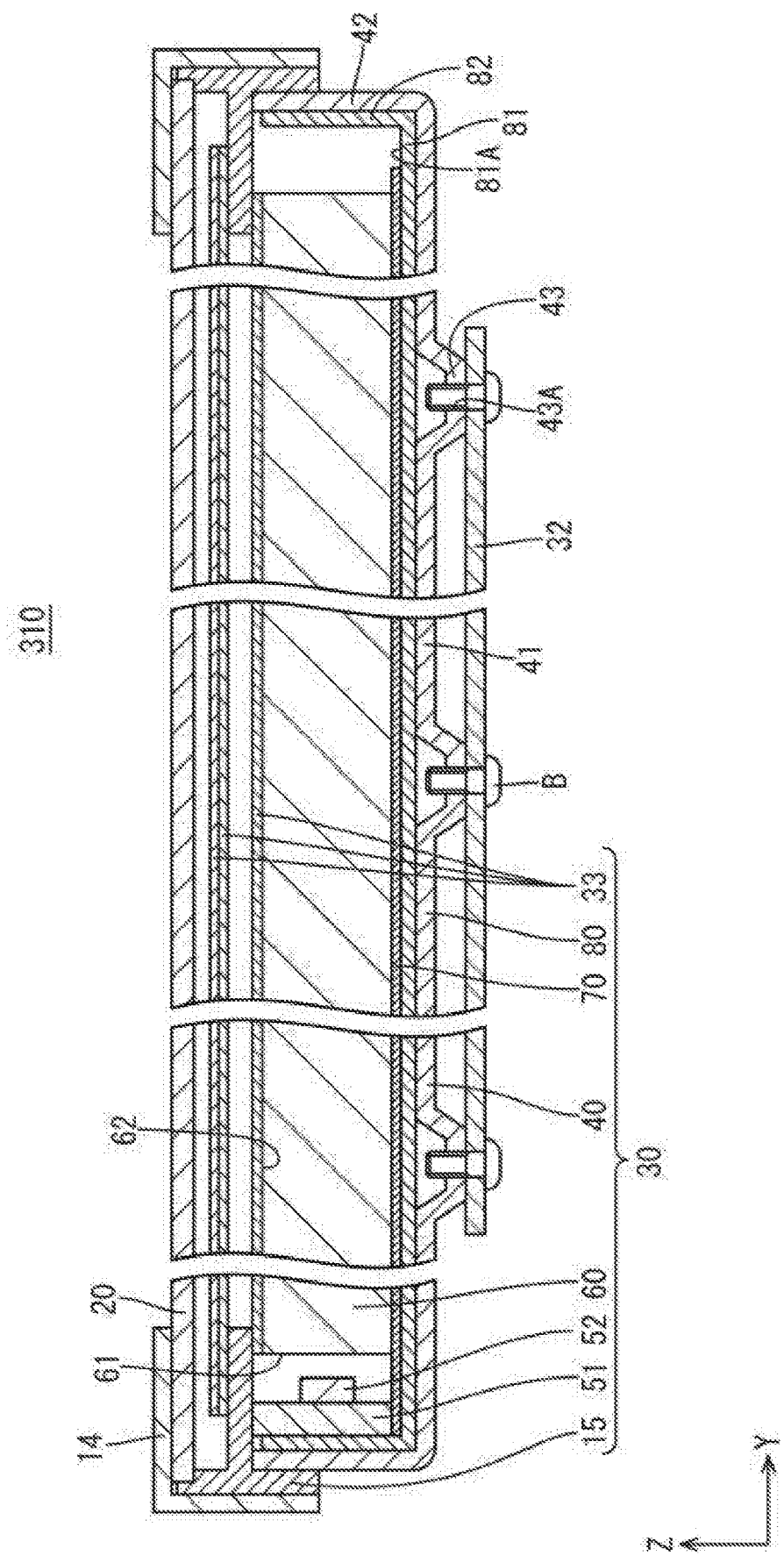
FIG. 5 is a cross-sectional view of a liquid crystal display device according to a fourth embodiment along line II-II in FIG. 1.

A liquid crystal display device 310 according to a fourth embodiment of the technology described herein will be described with reference to FIG. 5. In the fourth embodiment, the supplementary member 80 includes projecting portions 82 that project from outer edges of the body 81 of the supplementary member 80. Components, functions, and effects similar to those the first embodiment to the third embodiment previously described will not be described.

In this embodiment, the supplementary member 80 includes the projecting portions 82 that project from the outer edges of the body 81 toward the front side. The projecting portions 82 are located the outer edges of the body 81, respectively. Therefore, the supplementary member 80 has a box shape. The shapes and the sizes of outer surfaces (back surfaces) of the body 81 and the projecting portions 82 correspond with inner surfaces (front surfaces) of the bottom 41 and the sides 42 of the chassis 40 having the box shape. The outer surfaces of the supplementary member 80 are fitted with the inner surfaces of the chassis 40. Therefore, the supplementary member 80 is stably disposed. It is not necessary to provide the projecting portions 82 at all the outer edges of the body 81. At least two projecting portions may be provided at opposed edges (opposed long edges or opposed short edges) of the body 81.

Other Embodiments

The technology described herein is not limited to the embodiments described above and illustrated by the drawings. For example, the following embodiments will be included in the technical scope of the technology described herein.

(1) In the first embodiment, the recesses in the bottom of the chassis are provided for the mounting bases for mounting of the substrates. However, the recesses may be replaced with ribs with grooves to improve the rigidity of the bottom.

(2) In the first embodiment, the LEDs are disposed on the side surface of the light guide plate. However, the LEDs may be disposed on both of the opposed side surfaces and the backlight unit may be configured as a double-side light entering type edge-lit backlight.

(3) In each of the above embodiments, a method of holding the reflection sheet is not limited. For example, the chassis may include protrusions (e.g., holding pins) provided at the edges of the chassis and inserted in holes formed in edges of the reflection sheet to hang the reflection sheet.

(4) In each of the above embodiments, the LEDs are used for the light source. However, other types of light sources such as organic ELs may be used.

(5) In each of the above embodiments, the liquid crystal display device has the horizontally-long rectangular shape. However, liquid crystal display devices having vertically-long rectangular shapes other shaped may be included in the technical scope.

The invention claimed is:

1. A lighting device comprising:
   a light source;
   a light guide plate configured to guide light from the light source;
   a chassis including a bottom for housing the light guide plate and the light guide plate is recessed in the bottom, wherein the chassis has a box shape and includes sides that project from outer edges of the bottom;
   a reflection sheet disposed between the light guide plate and the bottom, the reflection sheet configured to reflect light toward the light guide plate; and
   a supplementary member including a body having a plate shape, the body disposed between the reflection sheet and the bottom, wherein
   the supplementary member has a box shape and includes projecting portions that project from outer edges of the body,
   outer surfaces of the body of the supplementary member have shapes and sizes that correspond to inner surfaces of the bottom of the chassis,
   the outer surfaces of the body of the supplementary member are fitted with the inner surfaces of the bottom of the chassis,
   outer surfaces of the projecting portions of the supplementary member having shapes and sizes that correspond to inner surfaces of the sides of the chassis,
   the outer surfaces of the projecting portions of the supplementary member are fitted with the inner surfaces of the sides of the chassis, and
   the body has a flat surface on the reflection sheet side.

2. The lighting device according to claim 1, wherein the body includes a single plate.

3. The lighting device according to claim 1, wherein the body is made of a synthetic resin material or a metal material.

4. The lighting device according to claim 1, further comprising a fixing member for fixing the supplementary member to at least one of the chassis and the reflection sheet.

5. The lighting device according to claim 1, further comprising an optical sheet disposed on a side of the light guide plate opposite from the reflection sheet and configured to exert an optical effect on light exiting the light guide plate.

6. A display device comprising:
   the lighting device according to claim 1; and
   a display panel configured to display an image using light applied by the lighting device.

7. The display device according to claim 6, wherein the display panel is a liquid crystal panel including a liquid crystal.

\* \* \* \* \*